United States Patent [19]

Barnwell et al.

[11] 4,448,757
[45] May 15, 1984

[54] PROCESS FOR REMOVING CONTAMINANTS FROM COMPRESSED AIR

[75] Inventors: James W. Barnwell, New Castle; Ernest J. Breton, Wilmington, both of Del.

[73] Assignee: Deltech Engineering, Inc., New Castle, Del.

[21] Appl. No.: 371,547

[22] Filed: Apr. 26, 1982

[51] Int. Cl.³ ............................................. B01D 53/34
[52] U.S. Cl. ........................................ 423/247; 55/23; 422/113; 422/122
[58] Field of Search .................... 423/210, 246, 247; 422/122, 113; 55/23

[56] References Cited

U.S. PATENT DOCUMENTS

| | | | |
|---|---|---|---|
| 2,096,851 | 6/1934 | Fricke | 55/319 |
| 2,251,000 | 7/1941 | Pyzel | 423/247 |
| 3,585,808 | 6/1971 | Huffman | 62/93 |
| 3,672,824 | 6/1972 | Tamura et al. | 423/247 |
| 4,003,979 | 1/1977 | Kanno et al. | 423/247 X |
| 4,089,655 | 5/1978 | Razete | 422/120 |

Primary Examiner—Earl C. Thomas
Attorney, Agent, or Firm—Connolly and Hutz

[57] ABSTRACT

An air purification system chills incoming air to condense water and toxic gases, adsorbs toxic molecules, reheats the air to reduce its relative humidity, and then converts oxidizable contaminants into carbon dioxide with an oxidation catalyst.

4 Claims, 2 Drawing Figures

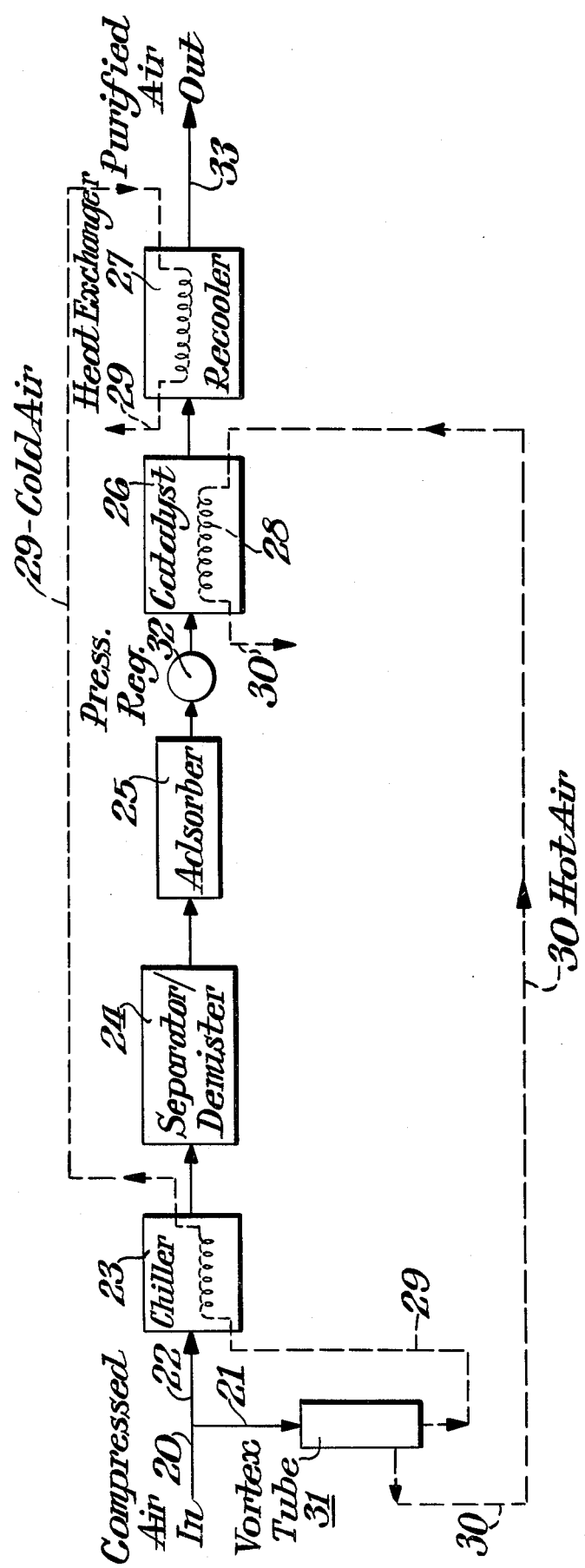

PROCESS FOR REMOVING CONTAMINANTS FROM COMPRESSED AIR

BACKGROUND OF THE INVENTION

This invention relates to methods for providing compressed air to be used for breathing by humans. Such air is frequently contaminated with organic vapors and carbon monoxide which must be eliminated or reduced to levels considered safe for human consumption. Maximum permissible concentrations of contaminants in breathing air are specified by the OSHA and the Compressed Gas Assoc., Inc.

Carbon monoxide is a particularly troublesome contaminant to remove from breathing air because it is not absorbed by charcoal and the common desiccants like silica gel, activated alumina and molecular sieves. In prior art systems carbon monoxide is typically eliminated or reduced to acceptable levels by passing this air through suitable catalysts such as Hopcalite material which converts CO in the air into $CO_2$.

Hopcalite and similar catalysts, however, are catalytically inactive at moisture levels of ambient air. As noted in Razette U.S. Pat. No. 4,089,655 (column 4, lines 11-15) these catalysts will remove CO by conversion to $CO_2$ only when there is relatively dry air in contact with the catalyst. To achieve the necessary dryness in the air the prior art has typically used desiccants upstream of the catalyst as taught, for example, in the Razette patent at column 3, lines 53-55.

Such systems have several deficiencies. The most serious one is the limited life of the desiccant causing frequent shutdowns to replace the desiccant. More importantly, if the desiccant is not promptly replaced the catalyst ceases to function increasing the likelihood of life threatening contamination of breathing air. Another deficiency is the chance that the system will become swamped with surges of contaminants that can occur when an air compressor overheats, or when chemicals are spilled near the air intake of the compressor. The capacity of both desiccant and charcoal adsorbents are likely to be exceeded under these circumstances. Another disadvantage of desiccant systems is the dryness of breathing air produced. For instance, air from the desiccant cited in U.S. Pat. No. 4,089,655 reduces the dew point down to $-70°$ F. This would seriously dehydrate the membranes of workers using the breathing air. Also, in some desiccant systems part of the breathing air is diverted and used to dry the desiccant which, of course, reduces the amount of breathing air available to the worker.

While other means of drying compressed air are taught in the prior art these means have not been adapted to the particular problems associated with preserving the operating efficiency of catalysts. For example, Huffman U.S. Pat. No. 3,585,808 discloses a compressed gas dryer utilizing a refrigeration cycle to first cool and then warm compressed gas but does not disclose nor appreciate how to condition compressed air that is to be passed through a catalyst. Similarly, Fricke U.S. Pat. No. 2,096,851 discloses use of an expansion valve to dry compressed air but contains no teaching directed to utilization of that air in conjunction with catalysts.

SUMMARY OF THE INVENTION

This invention overcomes the cited deficiencies of existing systems by eliminating desiccant drying of air through use of the evaporation and condensation stages of a compression type of refrigerator to reduce the relative humidity of the air being processed sufficiently to enable the Hopcalite catalysts to convert carbon monoxide to carbon dioxide. It has been discovered that by maintaining the relative humidity of air passing over the catalyst at less than 5% the catalyst efficiently converts CO to $CO_2$. This discovery has permitted use of means other than desiccants to dry the air entering the catalyst as well as drying it to a more comforable condition for use in breathing apparatus.

The preferred embodiment of this invention for converting compressed air to breathing air is as follows. First, the compressed air is chilled to remove moisture and condensable organic vapors. Either concurrently or in a subsequent stage condensed liquids are separated from the chilled air. Additionally, liquid mist is removed by a high efficiency coalescing type filter. Second, the chilled air free of liquid and mist is passed through a bed of activated charcoal to remove organic vapors that were not condensed in the chiller. Third, the air is reheated by the condensation stage of the refrigerator. This reduces the relative humidity. Additional reduction of the relative humidity as required by the process is achieved by reducing the pressure of the air being processed. Fourth, the resulting low relative humidity air is passed through a catalyst which is also heated by the condensation stage of the refrigerator. Here carbon monoxide is oxidized to carbon dioxide.

BRIEF DESCRIPTION OF THE DRAWINGS

The accompanying drawings illustrate exemplary embodiments of this invention in which.

FIG. 2 is a flow diagram of an alternate embodiment of the invention.

DESCRIPTION OF THE INVENTION

Figure 1:
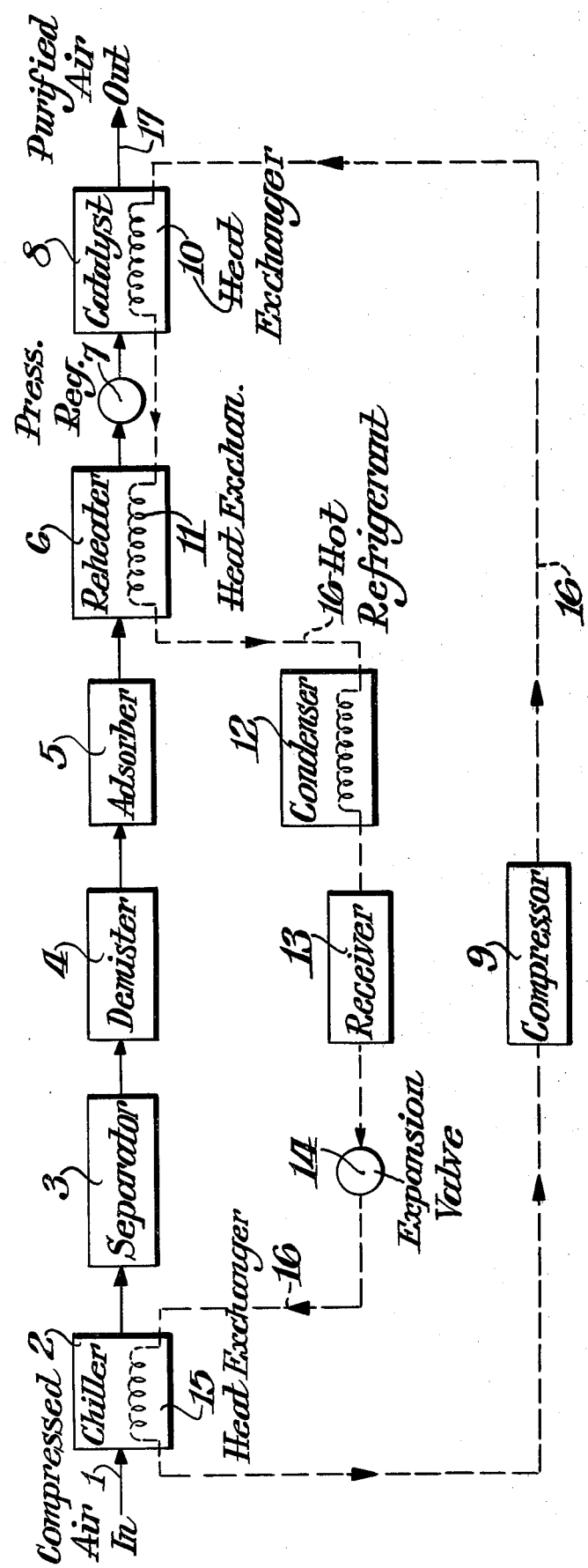
FIG. 1 is a flow diagram for one embodiment of the invention.

The compressed air to be treated may contain one or more contaminants that are harmful to breathing. The most common ones are oil mist and vapor from the air compressor. Other contaminants are carbon monoxide and thermal decomposition products of lubricants used in the compressor. These are introduced into the compressed air by a malfunctioning air compressor that overheats. Still other contaminants such as hydrogen sulfide, sulfur dioxide, acetone vapors, benzene vapors and other vapors from industrial chemicals may get into the compressed air through air intake to the compressor.

FIG. 1 illustrates the preferred embodiment of this invention used to remove these contaminants from compressed air. Incoming compressed air 1 goes through a series of stages 2 through 8 and egresses as purified air 17. Hot refrigerant, 16, compressed by compressor 9 passes through a heat exchanger 10 in the catalyst container 8 and then through a similar heat exchanger 11 in reheater 6. More heat in the refrigerant is exhausted in the condenser 12 and the resulting pressurized liquid is collected in a receiver 13. The refrigerant next passes through expansion valve 14 reducing the pressure of the refrigerant which results in cold refrigerant that flows through the chiller 2 and then back to the compressor 9.

The chiller 2 consists of a counter flow heat exchanger, 15, for transferring heat from the incoming air 1 to the refrigerant 16. This reduces the temperature of the air below 40° F. and hence the dew point of water to the temperature of the air. In this stage the concentration of higher molecular weight contaminants such as benzene and ketones, etc., are reduced down to levels defined by the vapor pressure of these substances at the temperature of the chilled air. Chillers of this invention are able to continuously remove large amounts of contaminants without loss of efficiency. This is required to cope with high levels of contaminants associated with chemical spills. Mist of liquid water, organic and inorganic chemicals condensed in the chiller over ten microns in diameter are removed in the separator 3. A centrifugal separator has been found to be effective although an impingement separator could be used in this stage. Compressed air at this stage may still contain liquids in the form of mist less than ten microns in diameter. This is removed by the demister 4. The preferred means for this stage is a coalescing type filter which removes over 99% of ingress mist.

The compressed air up through this stage could still contain gases of low boiling point substances such as formaldehyde and $H_2S$ that would not be condensed in the chiller. The air will also contain gases of compounds that were condensed in the chiller stage. Their concentrations are established by their vapor pressures at air temperatures within the chiller, separator and demister stages. However, the contamination levels are greatly reduced over what they would be in the air purification described in U.S. Pat. No. 4,089,655 that did not chill the incoming air. This is an important benefit of this invention, for it extends the useful life of the adsorption stage 5. There is less material to be adsorbed. The life of this stage is also extended because the incoming gas is cold, and the capacity of activated charcoal used in this stage is higher at lower temperatures. Activated charcoal is effective for removing organic vapors down to below .5 parts per million by weight. To enhance the removal of any particular contaminant, the activated charcoal can be preheated with an agent that would neutralize the contaminant. In addition to the charcoal or in place of it, other adsorbents could be used in this stage to remove a particular contaminant. Like the charcoal their capacity would be enhanced by the reduced temperatures of adsorption.

Of the common toxic substances contaminating compressed air, carbon monoxide is the only one that could penetrate the adsorption stage. This is oxidized in the catalyst stage 8. The preferred catalyst for oxidizing carbon monoxide below 300° F. is Hopcalite. However, it requires a water relative humidity is less than 5% to be effective at room temperature. To decrease the relative humidity of the air egressing from the adsorption stage to this level, it is heated by the reheater, 6. The heat exchanger, 11, transfers heat of compression from the refrigerant 16 to the air stream. Typically air will be heated to 150° F. This will reduce the relative humidity to less than 5%. If required, additional reduction of the relative humidity is achieved by reducing the pressure via regulator 7. The air then passes into the catalysts, which are also heated by the hot gas refrigerant 16 passing through heat exchanger, 10.

Heating the Hopcalite increases the rate of oxidation of carbon monoxide, and the tolerance of the catalysts for moisture. In this system the relative humidity of the air going into the catalysts is less than 5%. The catalyst used in this stage is not limited to Hopcalite. Any catalyst such as platinum catalyst that would oxidize carbon monoxide below 200° F. could be used.

The output of this system is purified compressed air 17 and liquid from the separator 3 and demister 4 stages. Only the charcoal will have to be periodically replaced. However, this will be replaced less frequently because the contaminant level is reduced and its adsorption capacity is enhanced by low temperature operation.

FIG. 2 depicts another embodiment of this invention for a backpack compressed air purifier. This uses the same principles as those employed in the system depicted in FIG. 1. Instead of the compressor 9 the portable system uses a vortex cooling tube obtainable from Vortec Corporation, Cincinnati, Ohio. Compressed air 20 flows into the vortex tube 31. It produces a cold stream of air, 29, that goes to the chiller, 23, and a recool stage 27. It also produces a hot stream of air, 30, that is used to heat the catalysts 26. Compressed air 20 is separated into the two streams 21 and 22. Stream 21 flows to the vortex tube as previously described. The other part of the air stream 22 flows into the chiller 23. Air plus liquid from the chiller flows into a combination separator and demister 24. Air from the separator/demister passes on to an activated charcoal adsorption stage 25. This is optional, depending upon the type of contaminants that may be present in the compressed air.

From the charcoal stage the pressure of the air may be reduced by pressure regulator 32 to adjust the relative humidity to that required for oxidation in the catalyst 26. Because vortex tubes can produce air over 200° F., the relative humidity will not have to be reduced as low as that required for the compressor-refrigerator air purification system depicted in FIG. 1. This catalyst stage is designed to bring air up to desired temperatures without first going through a preheater. The objective is to reduce the size of the system. To reduce the temperature of the air from the catalyst stage to that desirable for breathing, a recooler heat exchanger, 27, is used. Cold air, 29, from the vortex tube provides the heat sink for this stage. The output of the recooler, 27, is purified air 33 ready for breathing. Both the cold air stream, 29, and the hot air stream 30 are discharged into the atmosphere. The light weight of the vortex tube coupled with the consolidation of stages of this variation of the invention make it suitable for backpack use.

While a compression type refrigerator and a vortex tube were depicted in FIGS. 1 and 2, other means of first chilling and then heating the air stream being purified are covered by this invention. Adsorption refrigeration utilizing waste heat from compressors are examples of achieving the cooling and heating required by this invention.

Other embodiments of this invention include a stage that would adsorb carbon dioxide. A caustic material such as Sodasorb obtainable from W. R. Grace and Co., Lexington, is suitable for this stage. A pressure insensitive stream splitter can be used to divert only part of the compressed air through the carbon dioxide remover to maintain the carbon dioxide level of 500 ppm specified by the Compressed Gas Association Specification.

I claim:

1. A process for purifying compressed air used for human breathing comprising:
    (a) cooling of the compressed air to condense water and other condensable vapors in the compressed gas,
    (b) removing condensed water and other condensable vapors from the compressed air,
    (c) reheating the compressed air to reduce its relative humidity to below 5%, and (d) passing the reheated compressed air through one or more catalysts to convert carbon monoxide to carbon dioxide.

2. The process of claim 1 wherein the relative humidity of the compressed air is further controlled by reducing the pressure thereof after reheating.

3. The process of claim 1 wherein cooling of the compressed air is accomplished in the evaporation stage of a compression type refrigeration means and heating of the air is accomplished in the condensation stage of the refrigeration means.

4. The process of claim 1 wherein the relative humidity of the compressed air passing through the catalyst is further controlled by heating the catalyst.

* * * * *